UNITED STATES PATENT OFFICE.

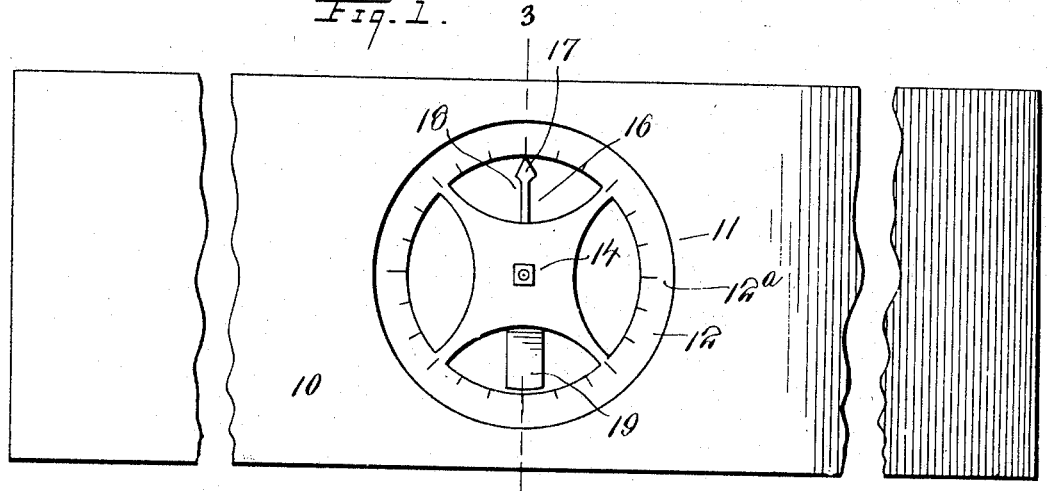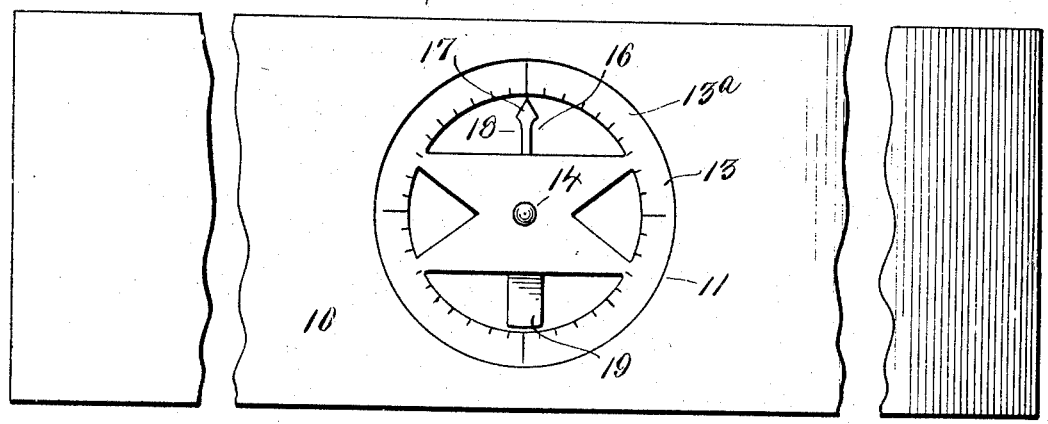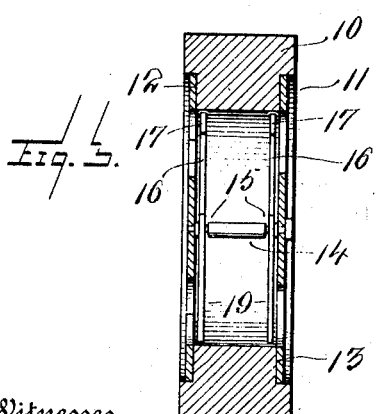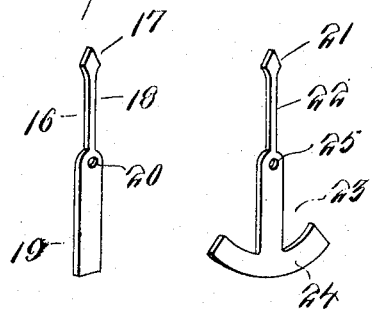

WARREN E. GROTEVANT, OF DOUGLAS, ARIZONA.

LEVEL.

1,038,352.   Specification of Letters Patent.   Patented Sept. 10, 1912.

Application filed July 12, 1911. Serial No. 638,140.

*To all whom it may concern:*

Be it known that I, WARREN E. GROTEVANT, a citizen of the United States, residing at Douglas, in the county of Cochise and State of Arizona, have invented new and useful Improvements in Levels, of which the following is a specification.

An object of the invention is to provide an instrument for determining the levels, angles and inclines of various surfaces and materials.

For the purpose mentioned, use is made of an apertured level bar having secured thereto a plurality of spaced dials provided with graduations, a shaft connecting the said dials and a plurality of pointers loosely journaled on the said shaft and independently operable, the said pointers each having one of their ends weighted, to permit the said pointers to gravitationally assume a vertical position relatively to the said level bar.

Reference is to be had to the accompanying drawings constituting a part of this specification, in which similar characters of reference denote corresponding parts in all the views, and in which—

Figure 1 is a fragmentary front elevation of my level. Fig. 2 is a rear fragmentary elevation of my level. Fig. 3 is a vertical sectional view taken on the line 3—3 in Fig. 1 of my level. Fig. 4 is a perspective view of one of the pointers. Fig. 5 is a perspective view of the modified form of pointer.

Referring more particularly to the views I provide a level bar 10 provided with a transversely extending aperture 11 and secured to the level bar 10, in the aperture 11 are a plurality of dials 12, 13, the dial 12 being provided with a series of graduations 12ª and the dial 13 being provided with a series of graduations 13ª, as will be seen by referring to Figs. 1 and 2. Extending transversely to the level bar 10, in the aperture 11 is a shaft 14, connecting the dials 12 and 13, the said shaft being provided with reduced portions 15 on which are journaled a plurality of pointers 16. The pointers 16 each consists of a narrow head 17, a shank 18 and a weighted tail 19, the tail 19 being provided with a transversely extending aperture 20. The pointers 16 are mounted independently operative on the shaft 14 and owing to the weighted tails 19 on the pointers, the same tend to gravitationally assume a vertical position relatively to the level bar 10. Portions of the dials 12 and 13 are cut away so that the pointers 16 can be seen by gazing through the cut away portions of the dials.

Assuming that the level bar 10 is mounted on a horizontal surface, the pointers 16 will be so positioned that the arrow head 17 will point toward the initial graduations on the dials 12 and 13. Now if an end of the level bar is slightly tilted the weighted tails 19 will cause the pointers to revolve on the shaft 14 and as the pointers at all times tend to assume a vertical position, the arrow heads 17 will indicate, by means of the graduations on the dials 12 and 13, the angle to which the level bar 10 is inclined. Thus it will be seen that with my device various levels, inclines and angles can be easily determined at all times and it will be further seen that by mounting the pointers loosely on the shaft 14 so that the said pointers will operate independently, accurate readings can be obtained with the use of my device, as the pointers must both be in alinement when the reading on the dials is taken. I preferably provide the dials 12 and 13 with different graduations, the graduations on one of the dials being adapted for use in determining various angles and the like, while the graduations on the other dial are preferably employed in connection with surveying and the determination of grades.

In Fig. 5 I disclose a pointer having a construction slightly different from the construction shown in Fig. 4 and in which I employ the usual arrow head 21, a shank 22 and the tail 23 having integrally formed on the lower end thereof an arc shaped extension 24, the tail 23 being provided with the usual aperture 25 through which the shaft 14 is adapted to extend. By providing the arc shaped extensions 24 on the pointers in my device, the said pointers will tend to more easily assume a vertical position when the level bar is tilted at an angle to the vertical and the provision of an arc shaped extension on each of the pointers embodies a more durable construction.

Having thus fully described the invention, what I claim as new, is:—

In a level, the combination with a level bar, of spaced dials mounted thereon and provided with cut-away portions, a shaft connecting the said dials and provided with reduced portions, and pointers journaled on the reduced portions of the said shaft, between the said dials.

In testimony whereof I affix my signature in presence of two witnesses.

WARREN E. GROTEVANT.

Witnesses:
A. F. PARSONS,
H. C. BRUMIER.